April 24, 1962     E. H. SHEFTELMAN     3,031,643
TRANSMISSION LINE FENCE BURGLAR ALARM
Filed May 16, 1960     2 Sheets-Sheet 1

*INVENTOR.*
EUGENE H. SHEFTELMAN
BY Kenway, Jenney,
Witter & Hildreth

ATTORNEYS

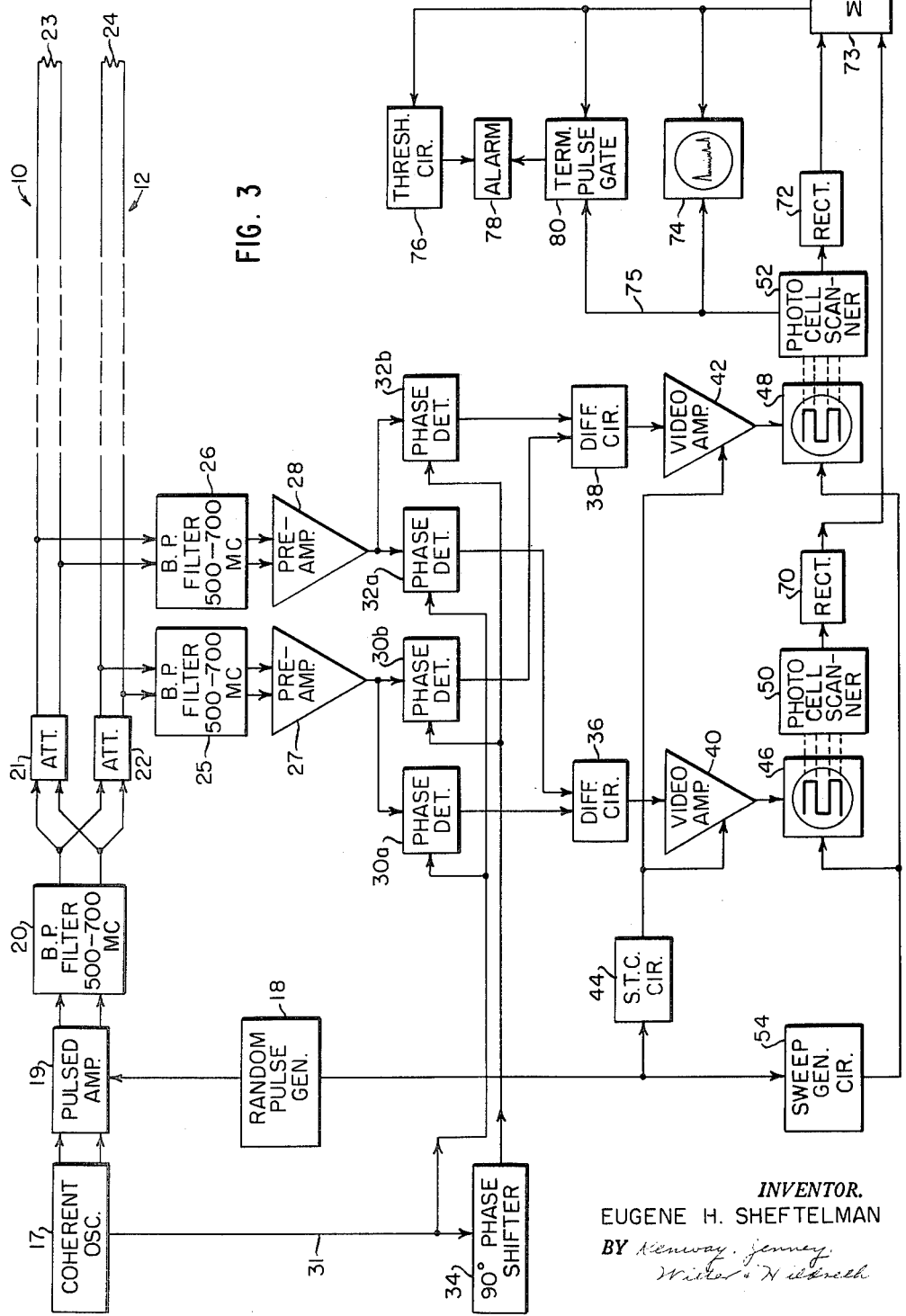

United States Patent Office 3,031,643
Patented Apr. 24, 1962

3,031,643
TRANSMISSION LINE FENCE BURGLAR ALARM
Eugene H. Sheftelman, Nashua, N.H., assignor to National Company, Inc., Malden, Mass., a corporation of Massachusetts
Filed May 16, 1960, Ser. No. 29,445
6 Claims. (Cl. 340—258)

My invention relates to apparatus designed to detect the presence of an intruder crossing or anywhere close to a perimeter extending along the surface of the ground. More particularly it relates to a system which detects intruders by measuring and displaying changes in the characteristics of a transmission line which is constructed along the perimeter, the changes in line characteristics resulting from the presence of the intruder.

The change in characteristic impedance of a section of a transmission line near an intruder causes this section to be mismatched with the rest of the line. If a signal is transmitted down the line when a section of it is mismatched, a portion of the signal is reflected at the boundary of the mismatched section back toward the signal source. This returned signal can be used both to indicate the presence of an intruder and to determine his approximate location along the perimeter.

Various types of apparatus are presently employed to detect intruders along a perimeter but all have serious disadvantages, especially if the perimeter to be protected is several miles long. Radar, when used to protect a region close to the ground, is ineffective over long perimeters because interference between direct and ground reflected waves cause high signal attenuation. Sonic-beam detectors, which set up fields of sound, are easily set off by gusts of wind or temperature changes and thus cause a high false alarm rate i.e. they indicate the presence of an intruder when, in fact, no intruder is present. Photoelectric devices are hampered in their operation by fog or falling snow which can block their beams. If pressure-sensitive devices are used along long perimeters, they are required in large numbers to avoid gaps. Radioactive sources producing gamma rays may also be used, an interruption of the ray indicating the presence of an intruder. However the cumulative effects of even small amounts of radiation which may be scattered by the sources at some distance from the perimeter may be dangerous to friendly personnel.

A number of perimeter protection systems are based upon the principle that an intruder changes the dielectric constant of the space around a fence formed by a pair of conductors. One arrangement that has been proposed based on this principle uses one conductor as a transmitting antenna and the other conductor as a receiving antenna. An intruder is detected by the variation in received signal caused by his presence in the electric field. Other detecting systems rely upon the change in capacitance between the conductors when an intruder is present. This change in capacitance may be indicated directly on a balanced bridge network, which measures the capacitance, or indirectly by the effect of the changed capacitance on the impedance of a tuned circuit or the output frequency of an oscillator. The common shortcoming of all these systems is that they attempt to compare the change in capacity due to an intruder with the capacity of the whole system when the intruder is not present. Thus these systems have relatively poor sensitivity because they attempt to detect a very small change in a large quantity.

My invention differs from prior systems utilizing capacity changes in that a preferred embodiment utilizes two conductors as a transmission line. A portion of the input signal to the line is reflected at each extremity of any section of the line whose characteristic impedance is changed by the presence of an intruder. The magnitude of the reflected signal is dependent upon the difference in the characteristic impedance of the line at these boundaries. Therefore it detects an intruder by a comparision of the changed impedance of a small perturbed section of line with the normal characteristic impedance of a short section adjacent either end of the perturbed section. Thus my invention has an inherent sensitivity many orders of magnitude greater than prior two conductor detectors could attain with an equal amount of equipment.

In addition, my invention may be used to indicate the approximate location of the intruder by measuring the time for a reflected signal to return from the perturbed section to the source. Prior to my invention two conductor systems had to be broken down into a great many small units of relatively short length, e.g. ten feet, and each of these sections sampled by a commutator to give information as to an intruder's location. The amount of equipment that is needed for such an arrangement makes this type of system highly impractical.

Accordingly, it is a principal object of my invention to provide apparatus for detection of intruders around a long perimeter. Another object of my invention is to provide a transmission line intruder detector having many times greater sensitivity than could previously be attained with comparable equipment. A further object of my invention is to provide a system of the type described which is both rugged in construction and relatively simple in installation. Another object of my invention is to provide a system of the type described which permits accurate determination of the location of an intruder. A further object of my invention is to provide a system of the type described having both an alarm device and a display device to indicate the presence of an intruder. A still further object of my invention is to provide an intruder detection system that is comparatively difficult to avoid or to jam. It is another object of my invention to provide a system which indicates at the terminal location any sabotage of the equipment.

A feature of my invention is to provide a system which is relatively insensitive to interference from external sources of electromagnetic radiation and causes substantially no interference with adjacent electronic equipment because of its own radiation. Another feature of my invention is that it provides a system which may be used in conjunction with another similar system in such a way that the two systems balance each other to attain even greater sensitivity than that provided by a single system by cancellation of fixed echoes.

My invention accordingly comprises the features of construction, combinations of elements, and arrangement of parts which will be exemplified in the construction hereinafter set forth. The scope of the invention will be indicated in the claims.

For a fuller understanding of the nature and objects of my invention, reference should be had to the following detailed description taken in connection with the accompanying drawings, in which.

Figure 2:
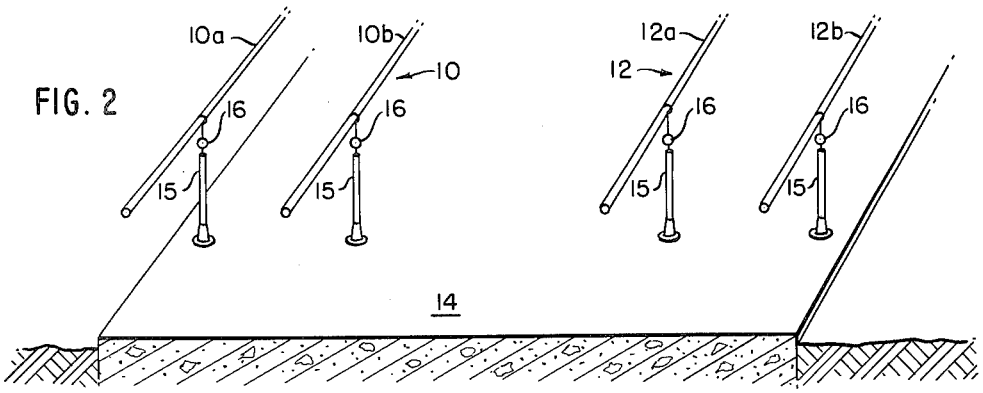
FIG. 2 is a pictorial diagram showing the physical arrangement of a pair of transmission lines for cancellation of fixed echoes.
Figure 4:
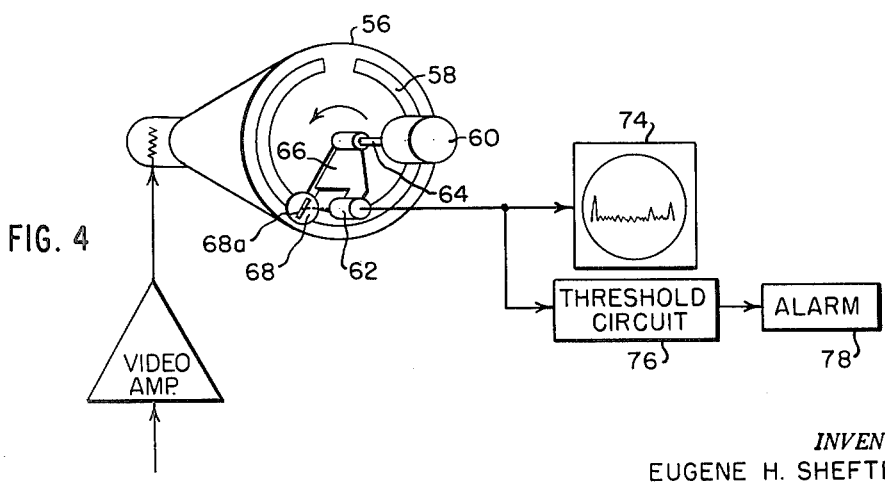

FIG. 3 is a detailed block and line diagram of a second embodiment of a transmission line intruder detector made according to my invention which utilizes a pair of balanced transmission lines such as are illustrated in FIG. 2; and FIG. 4 is a diagram, partially pictorial and partially schematic, of a cathode-ray tube integrator and associated equipment which might be used to display reflected signals from the transmission line.

Figure 1:
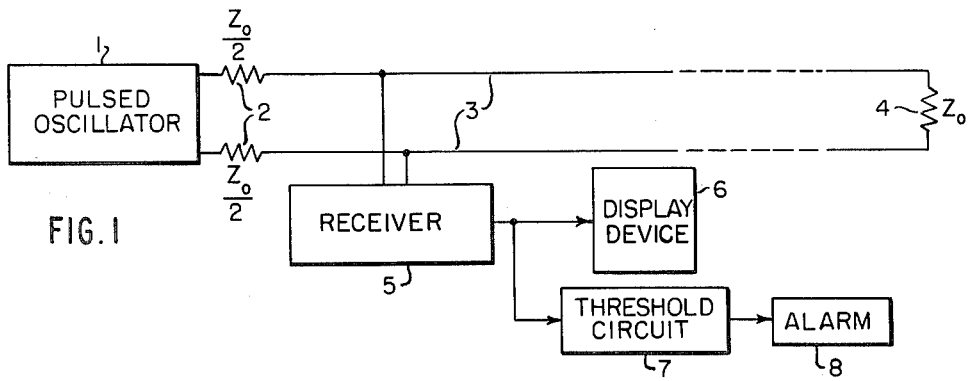
FIG. 1 is a block and line diagram of one embodiment of a transmission line intruder detector made according to my invention.

The general principles upon which the construction and operation of the transmission line intruder detector of my invention are based may best be understood by referring to FIG. 1. As shown therein, a pulsed oscillator 1 provides a radio frequency (RF) input signal to a transmission line 3. By radio frequency I mean, any frequency at which coherent electromagnetic radiation of energy is useful for communication purposes. The line 3 is terminated in a resistive load 4 whose value is nearly equal to the characteristic impedance of the transmission line $Z_0$ thereby providing an almost reflectionless load. The oscillator 1 has an output impedance much smaller than $Z_0$, and is connected to the transmission line through a pair of matching loads 2, each having the value $Z_0/2$. The transmission line itself, which is formed by a pair of conductors, extends around the perimeter to be protected.

In operation, the pulsed oscillator 1 supplies pulses of high frequency energy which travel down the line 3. If an intruder approaches the line, the characteristic impedance of the line is changed in the vicinity of the intruder. This change in characteristic impedance causes a portion of the incident high-frequency pulse to be reflected toward the input end of the line. The reflected pulse appears as an input signal to a receiver 5 and indicator 6 located at or near the input end of the line. The receiver may include an integrating device which sums the reflected pulses over a period of time to minimize the effects of unwanted reflections from such causes as external sources or random effects, thereby enhancing the signal to noise ratio. Such an integrating device is not required for the invention but its use makes the system considerably more sensitive to the presence of an intruder. The received signal is also connected to a threshold circuit 7, which, when it receives a signal greater than a predetermined level, triggers an alarm 8 thus alerting a guard to the presence of the intruder. The display device may be a cathode-ray oscilloscope, for example, similar to a radar A-scope in which the transmitted signal also triggers the sweep circuits and the received signal is displayed when received. The distance along the sweep between transmitted pulse and received signal is then a measure of the distance of an intruder along the transmission line from the transmitter and receiver. Returning echoes are absorbed in the receiver and in loads 2 so they are not sent back over the line once more.

In describing the general principles of the operation of the transmission line intruder detector, it has been assumed that no reflections occurred due to such things as line supports, irregularities in the surrounding terrain and other inhomogeneities in the environment. In actuality, these unwanted reflections exist.

To minmize the effects of this clutter and thereby increase the sensitivity of the detecting system, an arrangement of the transmission lines as shown in FIG. 2 is preferred. As shown therein, a pair of transmission lines generally indicated at 10 and 12 are provided which encircle the area to be protected. Each of the transmission lines comprises a pair of hollow conductive tubes 10a, 10b, and 12a, 12b. For example copper-coated steel tubes of approximately 1 inch outside diameter may be used, the tubes being spaced for example about 5 feet apart in the horizontal plane to form each line. The tubes are supported above a strip of roadway or pavement 14; sufficient space may be provided between the transmission lines to permit the passage of a patrolling vehicle is desired. The lines themselves are supported above the roadway 14 on substantially identical insulating stanchions 15. An impedance adjusting element 16 may be provided in each support, which provides both variable resistive and reactive components. By adjusting the element 16, the reflections from points of support along the line may be varied so that the reflections from each line are substantially the same.

In operation, both lines are pulsed simultaneously and the reflected signals from each line are subtracted. Thus the effect of fixed echoes, such as those from the line supports 15 are eliminated or substantially reduced. Since an intruder must approach one of the pairs of lines first, he will cause a greater perturbance in that line than in the other line; the resulting reflected signal will not be cancelled out by the other line and his presence will be apparent.

An embodiment of my improved intruder detector is illustrated in greater detail in FIG. 3. In this figure I have illustrated a system utilizing two transmission lines as described above in connection with FIG. 2. However, it will be understood that with appropriate changes, the circuit of FIG. 3 might be used with a single transmission line.

The electronic components used in the transmission line intruder detector are, in general, commercially available standard parts. The construction and operation of these components are known to those skilled in the art and will not be described in detail except when any of these standard components require modification for use in my apparatus. These modifications will be hereinafter described.

A coherent oscillator 17 (i.e. an oscillator which maintains a high degree of frequency and phase stability over short periods of time) whose frequency is preferably controlled by a quartz crystal is the source of input power to the transmission lines 10 and 12 of FIG. 3. The oscillator preferably produces a carrier signal having a frequency of about 600 mc. This frequency is chosen since it is in a region of the frequency spectrum where any radiation from the lines will not interfere with other services. However the frequency is not critical and other frequencies, if appropriate for use with the line, may be used if desired.

A random pulse generator 18 gates the amplifier 19 and thus modulates the carrier signal developed by the coherent oscillator. The random pulse generator 18 produces pulses which are randomly spaced in time. Illustratively, the pulses may be generated with a random period of between 100 and 200 microseconds i.e. with a random frequency of between 5 and 10 kilocycles per second. It is desirable that the pulse generator have a random repetition rate in order to cause the spectrum of the radiated power to be distributed as uniformly as possible over the pass band of the equipment. If the spectrum consisted of discrete lines, serious interference with nearby equipment could occur, especially should the pass band of such other equipment include one of the lines.

The length of the transmitted pulse is chosen on the basis of the length of line likely to be perturbed by an intruder. The reason is that a pulse which is longer than necessary may encompass a number of fixed sources of reflection which have an appreciable masking effect upon a perturbation resulting from the presence of an intruder. Moreover, the pulse should be sufficiently short that reflected pulses which are produced at each end of a perturbed section do not overlap and possibly cause destructive interference with each other. However, an unduly short pulse is unnecessary and wasteful of bandwidth. I have found that the length of the input pulse which is preferable is equal to or less than twice the length of the section of line likely to be perturbed. If the presence of an intruder, for example, causes a perturbance in a 5 foot section of line, a pulse 10 feet or approximately 10 millimicroseconds long is indicated since the speed of propagation of the pulse down the line is approximately 1 foot per millimicrosecond. If the pulse of this length is used to modulate a 600 megacycle carrier signal, for example, most of the sideband energy will be contained in a band between 500 mc. and 700 mc. Although FIG. 3 illustrates a system passing both upper and lower sidebands, it is quite feasible to restrict the transmission to one sideband, for instance the lower sideband with a further reduction in interference to and from nearby equipment. It will be apparent to those versed in the art that since the system utilizes coherent detection the removal of one sideband causes no loss in the information content of the echoes.

The envelope of the pulse generated by the pulsed amplifier 19 is preferably, although not necessarily, an isosceles triangle. This shape requires a smaller bandwidth than a pulse with a steeper envelope, as for example a rectangular pulse.

A band pass filter 20 through which the pulse output from amplifier 19 is connected to the transmission line sharply attenuates any frequencies outside the desired 500 mc. to 700 mc. band. The attenuators 21 and 22 are placed at the input to the transmission lines 10 and 12 to prevent reflected signals from being reflected again at the input end of the line and traversing the line a second time in the forward direction. Each transmission line is terminated in a load 23 and 24, each of the loads having an impedance which is almost the same as the characteristic impedance of the line, but is slightly mismatched so that there will be a small reflected wave from the end of the line. The appearance of the reflected signal with proper delay indicates that the line has not been cut and terminated earlier and that the system is operating properly and therefore serves as a check for surveillance personnel.

A reflected pulse resulting from an intruder enters either or both band pass filters 25 and 26 which prevent signals not in the 500–700 mc. band from entering the receiver circuitry. The reflected signal is then amplified in low noise preamplifiers 27 and 28, respectively.

The amplified signal from each of the preamplifiers is detected by a pair of coherent phase detectors, those for the line 10 being identified by the reference characters 30a and 30b and those for line 12 being identified as 32a and 32b. A pair of phase detectors rather than a single detector is desirable for each line because the disturbance might occur at a location on the line such that the phase of the reflected signal entering a single phase detector is displaced 90° with respect to that of the demodulating signal fed to the detector. In this situation an intruder might not be detected since the phase sensitive detector would provide no output signal. By using a pair of phase detectors, one of which detects signals which are 90° out of phase with the other, no matter what the phase of the reflected signal there will be an output from at least one of the detectors. These output signals from the detectors represent the in-phase component and the quadrature component of the reflected signal from the perturbed section of line. The reference signal for each of the phase sensitive detectors is supplied by the coherent oscillator 17 via lead 31. The reference signal for the detector producing the quadrature component of the reflected signal is supplied by passing the output of the oscillator 17 through a 90° phase shifter 34 before it is supplied to the detectors 30b and 32b.

The in-phase components derived from the reflected signals from the lines 10 and 12 are fed to subtraction or difference circuit 36. The quadrature components of the reflected signals are similarly fed to a difference circuit 38. The output signals from the circuits 36 and 38 represent the differences in amplitude of the in-phase and quadrature components, respectively, of the reflected signals from line 10 and line 12. Thus any fixed echoes common to both lines are cancelled and only the difference signals are presented. These output signals from the difference circuits are amplified in the wide-band bipolar video amplifiers 40 and 42, which have substantially uniform gain and negligible phase distortion over a wide band of frequencies, 3 mc. to 100 mc. for example.

The gain of the amplifiers is controlled by the sensitivity time control circuit 44. This circuit receives a pulse from the random pulse generator 18 at the same time a pulse is applied to the pulsed amplifier 19, and generates a saw-tooth gain control signal each time a pulse is received which changes the gain of the video amplifiers 40 and 42 to compensate for the effects of varying attenuation suffered by reflected waves from different parts of the line. Thus a signal received from the part of the transmission line near the transmitter and receiver will suffer slight attenuation as compared to a signal from the far end of the line. By controlling the gain of the amplifiers 40 and 42 so that the gain is relatively low immediately following transmission and gradually increases to its maximum value in the time necessary for a round trip down the line, the magnitude of the signals applied to the display circuitry are substantially independent of the place of their origin. This circuit can also be used to suppress or blank the display of the transmitted pulse if desired.

As previously noted in connection with FIG. 1, it may be desirable to integrate the received signals over a period of time to enhance the signal to noise ratio. Integration of the received signal is accomplished in the embodiment of FIG. 3 through the use of a pair of cathode-ray tube oscilloscope units 46 and 48 having long persistence phosphors (i.e. phosphors which continue to emit light for a relatively long time after the excitation is removed). The cathode ray tube is swept once for each transmitted pulse and the receiver signals are used to intensity modulate the beam. Each point on the cathode ray tube sweep thus corresponds to a point on the transmission line. The brightness of the trace, which is a function of the sum of the impressed signals, is measured periodically by the photoscanners 50 and 52.

The photocell scanners 50 and 52 include a photoelectric cell and a mechanical scanning device which causes the photocell to scan the cathode ray tube face in a pattern the same as the sweep pattern on the cathode-ray tube. The photocell of the scanner is masked so that light may enter the cell through only a narrow slit positioned in front of the photocell. The slit is as narrow as possible to obtain high resolution, and as long as the width of the trace on the face of the tube. The mechanical scanning device also generates an electrical synchronizing signal for use in synchronizing other equipment with the photocell scanners.

The period of the photoscanner sweep is much longer than that of the cathode ray tube sweep. The electrical output signal from the photoscanners 50 and 52 is an integration of the difference between the in-phase and quadrature components, respectively, of the reflected waves in the two transmission lines. To achieve sufficient resolution to detect the location of an intruder precisely, the length of the trace on the cathode ray tube should be as long as possible. This can be accomplished by having a step-type trace as illustrated which moves back and forth across the face of the cathode ray tube several times. The sweep circuits 54 provide such a trace for the cathode ray tubes 46 and 48, each sweep being initiated by pulses from the random pulse generator 18. The trace should, in addition, be wide in a direction perpendicular to the direction of travel of the sweep to average out the effects of individual grains of phosphor deposited on the face of the cathode ray tube but should be narrow in the direction of travel to give maximum resolution. A satisfactory, but not required, scanning rate would be approximately 10 scans per second, the electrical sweep rate being between 5 and 10 kilocycles per second depending upon the pulse rate from the random pulse generator.

It is preferable to provide a reference brightness level for the cathode-ray tube sweep rather than merely allowing signals to brighten an otherwise invisible trace. The reason for this is as follows. The function of the integrating device is to enhance the ratio of signals received from the transmission line to the noise present at the receiver input terminals. The noise is statistical, i.e. randomly varying, and includes components which will both increase and decrease the trace brightness while the signals will only brighten the trace. Thus, if the cathode ray tube was normally dark, those components of noise which could tend to reduce the "noise brightness" would not be presented. Hence, traces due to noise would have a higher brightness relative to the signal under these conditions than they would if components of noise both adding to and subtracting from trace brightness were effective. This is another way of stating a well-known result of information theory: coherent summation of weak signals in a linear adder leads to greater signal-to-noise improvement than summation of the same signals in a non-linear device.

In FIG. 4 I have illustrated another signal integrator using a different scanning system. This integrator is particularly useful if a constant frequency pulse generator is used rather than the random pulse generator 18 of FIG. 3. As shown, the trace 58 on the cathode-ray tube is circular in configuration. A synchronous motor 60 is used to cause the photocell 62 to scan the face of the cathode-ray tube at a rate which is much lower than the sweep rate and, if a constant frequency pulse generator is used, may be a sub-multiple of the repetition rate of the trace. The photo-cell itself is mounted on the motor shaft 64 by a support bracket 66. A disc 68 having a slit 68a formed therein is also mounted on the bracket 66 and accordingly is also driven by the motor 60. The photocell 62 is mounted on the bracket so that its field of view is coincident with the slit in the disc 68. The disc 68 masks all light from the trace except for light which comes through the slit. In the integrator of FIG. 4 the swept area of brightness which forms the circular trace should be wide in the radial direction as previously mentioned, and narrow in the direction of travel.

As shown in the circuit of FIG. 3 the integrated signal from the photoscanners 50 and 52 is rectified in the full-wave rectifiers 70 and 72. After rectification the quadrature and the in-phase components of the signal may be combined, as in summing circuit 73, to provide a signal for actuating the alarm and display circuits.

A display circuit 74 utilizing a cathode ray oscilloscope as an A-scope, such as used in radar systems, may be used to indicate the location of an intruder. The A-scope trace is synchronized with the sweep of the photocell scanners by the synchronizing signal generated thereby and connected to the oscilloscope via lead 75. The length of the trace corresponds with the time of one scan of the photocell scanners 50 or 52; thus each point on the A-scope trace corresponds to a particular location on the sweep of the cathode ray tube integrator and therefore to a point on the transmission line. An increased signal at any point on the A-scope trace indicates a perturbance at that section of the line.

An alarm circuit to alert an attending guard may also be provided as previously described. Thus, the signal from the summing circuit is connected to a threshold circuit 76 which is preset so that if incoming signals fall above an upper or below a lower signal limit, an alarm 78 is set off. The presence of signals greater than the upper limit indicate a perturbance on the line and therefore an intruder. Incoming signals below the lower limit indicate the line is not functioning properly due either to sabotage or a malfunction of the equipment.

To provide a continuous check on line operation I also provide a terminating pulse gate circuit 80. This circuit is supplied with the sum of the video output signals from summing circuit 73 and with a pulse synchronized with the start of a scan of the photocell scanner via lead 75. The circuit generates a gate slightly shorter in time than the length of one scan of the photocell and at the end of this gate, samples the video output from circuit 73. If a signal is not present at the end of the photocell scanner sweep corresponding to the reflection from the slightly mismatched loads 23 and 24, the alarm circuit 78 is actuated. The absence of this pulse indicates that the line has been sabotaged or that the system is not operating properly.

Thus I have provided an improved intruder detector which uses a transmission line running along the perimeter of the protected area to indicate the presence of intruders, the intruder causing a change in the characteristic impedance of a section of the line. A reflected signal generated at the boundaries of the perturbed section is detected and used to indicate the presence and location of the intruder. The detecting circuitry may sound an alarm if an intruder is present, if sabotage of the equipment is attempted, or if the system malfunctions. Two sets of transmission lines may be provided to cancel fixed echoes and improve sensitivity. While I have illustrated a particular arrangement for a receiver and display circuit, which provides signal to noise ratio enhancement by signal integration, it will of course be understood that under some conditions such enhancement is not required and integration may be omitted. It will also be understood that other types of known signal integrators may be used to provide this same function, and further that other techniques of signal to noise ratio enhancement may be used all without departing from the scope of my invention. The components of my system may be varied from those suggested by way of example to achieve lower cost or higher sensitivity without changing the basic novel concepts upon which the system is based. The preferred arrangement here disclosed is intended to be only illustrative of one possible type of arrangement.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, may be said to fall therebetween.

Having thus described the invention, I claim:

1. Apparatus for detecting the presence of intruders and other foreign objects in the vicinity of a boundary, said apparatus comprising a radio frequency transmission line extending along said boundary, a coherent radio frequency oscillator, a modulating device to apply repetitively to one end of said transmission line pulses of radio frequency energy from said oscillator, a detector having a first input circuit coupled to said oscillator, a second input circuit coupled to said transmission line to detect pulses reflected from a region of said line which is perturbed due to the presence of a foreign object in the vicinity thereof, and an output circuit, means including a video amplifying device and an integrating device coupled to the output circuit of said detector to derive a signal which adds the detected pulses from said detector, and means to provide an indication of said signal.

2. Apparatus according to claim 1 including a phase shifting device coupled to said oscillator, a second phase detector having a first input circuit coupled to said phase shifting device, a second input circuit coupled to said transmission line in common with said first phase detector, and an output circuit, second means including a video amplifying device and an integrating device coupled to the output circuit of said second phase detector to derive a signal which sums detected pulses from said second phase detector, and a summing circuit to combine the signals from said first and second amplifying and integrating means prior to indication thereof.

3. Apparatus for detecting the presence of intruders and other foreign objects in the vicinity of a boundary, said apparatus comprising a pair of radio frequency transmission lines extending parallel to one another along said boundary, means to produce repetitively pulses of radio frequency energy and apply them to adjacent ends of said transmission lines for transmission thereby, first and second detection means to produce signals representing pulses reflected from adjacent regions of the respective lines which are perturbed due to the presence of a foreign object in the vicinity thereof, means to derive a signal indicative of the difference of the signals produced by said first and second detection means, and means to produce an indication of said last-named signal.

4. Apparatus for detecting the presence of intruders and other foreign objects in the vicinity of a boundary, said apparatus comprising a pair of radio frequency transmission lines extending parallel to one another along said boundary, plural means for supporting said lines above ground level and having adjustable impedances to equalize fixed discontinuities in both lines, means repetitively to produce pulses of radio frequency energy and apply them to adjacent ends of said transmission lines for transmission thereby, first and second detection means to produce signals representing pulses reflected from adjacent regions of the respective lines which are perturbed due to the presence of a foreign object in the vicinity thereof, means to derive a signal indicative of the difference of the signals produced by said first and second detection means, and means to produce an indication of said last named signal.

5. Apparatus for detecting the presence of intruders and other foreign objects in the vicinity of a boundary, said apparatus comprising a radio frequency transmission line extending along said boundary, means to produce repetitively pulses of radio frequency energy and apply them to one end of said line for transmission thereby, means to detect pulses reflected from a region of the line which is perturbed due to the presence of a foreign object in the vicinity thereof, a cathode ray tube having a screen, means to produce a beam of electrons generating repetitively and in synchronism with said transmitted pulses, a luminous trace on said screen, means to modulate the intensity of the beam during each trace in response to reflections from a corresponding transmitted pulse, said screen having sufficient persistence to provide an indication of the sum of a number of pulses reflected from the same region of the line in terms of the light intensity of the incremental portion of the trace corresponding to said region, and photosensitive means to provide signals representative of the light intensities of successive incremental portions of said trace at a rate substantially less than the rate at which said trace is generated.

6. Apparatus according to claim 5 wherein said means to indicate a said signal from said signal deriving means includes a second cathode ray tube, means to produce a linearly sweeping beam of electrons repetitively in synchronism with the transmitted pulses, and means to cause deflection of said beam in response to signals from said photosensitive means.

References Cited in the file of this patent

UNITED STATES PATENTS

| | | |
|---|---|---|
| 2,345,932 | Gould | Apr. 4, 1944 |
| 2,455,376 | Lindsay | Dec. 7, 1948 |

FOREIGN PATENTS

| | | |
|---|---|---|
| 704,779 | Great Britain | Mar. 3, 1954 |

OTHER REFERENCES

Publication: Power Apparatus & Systems, pages 518–530; "Fault Location Methods For Overhead Lines" by Stringfield, Marihart, Stevens; August 1957.